United States Patent [19]

Chuiton et al.

[11] Patent Number: 5,073,715

[45] Date of Patent: Dec. 17, 1991

[54] ORIENTATION DETECTOR OF SOURCES EMITTING RADIOACTIVE RADIATION

[75] Inventors: René Chuiton, Clamart; Maurice Chemtob, Creteil; Philippe Kissel, Paris, all of France

[73] Assignee: Commissariat a l'Energie Atomique, Paris, France

[21] Appl. No.: 549,482

[22] Filed: Jul. 6, 1990

[30] Foreign Application Priority Data

Jul. 18, 1989 [FR] France ............................... 89 09627

[51] Int. Cl.$^5$ .......................... G01B 15/00; G01T 1/24
[52] U.S. Cl. ............................... 250/370.01; 250/394; 250/336.1
[58] Field of Search ................. 250/370.01, 253, 394, 250/336.1, 336.2, 515.1

[56] References Cited

U.S. PATENT DOCUMENTS 3,436,539  4/1969  Wilcox ........................... 250/394 X
3,539,806  11/1970 Humphrey ..................... 250/394 X

FOREIGN PATENT DOCUMENTS 2357914  2/1978  France .
1142924  2/1969  United Kingdom .

Primary Examiner—Constantine Hannaher
Assistant Examiner—Edward J. Glick
Attorney, Agent, or Firm—Joseph P. Calabrese

[57] ABSTRACT

An orientation detector for radioactive sources is provided.

Such detector comprises a homogeneous sphere containing six sensors arranged on three different diameters at a limited depth from the sphere surface. Comparison of the radiation received and differently attenuated by the material of the sphere makes it possible to deduce the angular disposition of the source relative to the detector.

7 Claims, 1 Drawing Sheet

ORIENTATION DETECTOR OF SOURCES EMITTING RADIOACTIVE RADIATION

BACKGROUND OF THE INVENTION

1. Field of the Invention

This invention relates to an orientation detector of sources emitting radioactive radiation.

2. Background of the Prior Art

Wilcox U.S. Pat. No. 3,436,539 describes a detector of the azimuth angle of the source (the angle formed by the direction of the source with a fixed vertical plane). The Wilcox detector comprises three crystals located in a box or case at angular intervals of 120°. The crystals are partly inserted in a screen, which has partial absorption properties of the radiation as a function of the distance by which said radiation traverses said material. For certain orientations of the source, a crystal is directly reached by the radiation and the two other crystals are reached after the radiation has traversed a certain screen thickness. For other source orientations, the three crystals are only reached after the radiation has traversed part of the screen. As a function of the azimuth of the source, it is possible to obtain signals from the crystals having a sinusoidal configuration and phases displaced by 120°, but this leads to a very complicated shape of the screen.

The Wilcox invention relates to a detector comprising a screen partly absorbing the radiation and sensors located in said screen, but the detector described hereinafter has a much simpler design and is able to supply more precise and more complete measurements. Moreover, unlike other detectors, there is no need to orient it towards the source in order to carry out the measurement.

SUMMARY OF THE INVENTION

In accordance with this invention, an orientation detector of sources emitting punctiform radioactive radiation is provided. A source of punctiform radiation refers to a source whose radiation can be considered as having a single direction no matter when point of the detector is reached. The provided detector comprises a homogeneous sphere formed of a material which absorbs radiation in a proportion which varies as a function of the length of the part of the sphere material traversed by the radiation. Six radiation sensors are disposed in the detector provided by this invention which also provides a system for measuring and comparing the radiation received by the sensors.

The sensors of the detector are positioned in pairs on three different diameters of the sphere and react to the radiation received in accordance with characteristics independent of the direction of the source prior to being inserted in the sphere. Accordingly, their output signal is only dependent on the energy and the intensity of the radiation received. The sensors are advantageously located at the same distance from the center of the sphere and on three diameters which are perpendicular to one another.

In accordance with this invention, each of the radiation sensors comprises at least one semi-conducting pellet and a measuring circuit. The sensors are received in sphere openings which are then filled with a moldable material having a density identical to the material of the remainder of the sphere. In the case of an aluminium sphere, said material can be a mixture of glue and an alumina powder.

The invention is described in greater detail hereinafter, relative to limitative embodiments and the attached drawings, which show:

DESCRIPTION OF THE PREFERRED EMBODIMENT

Figure 1:
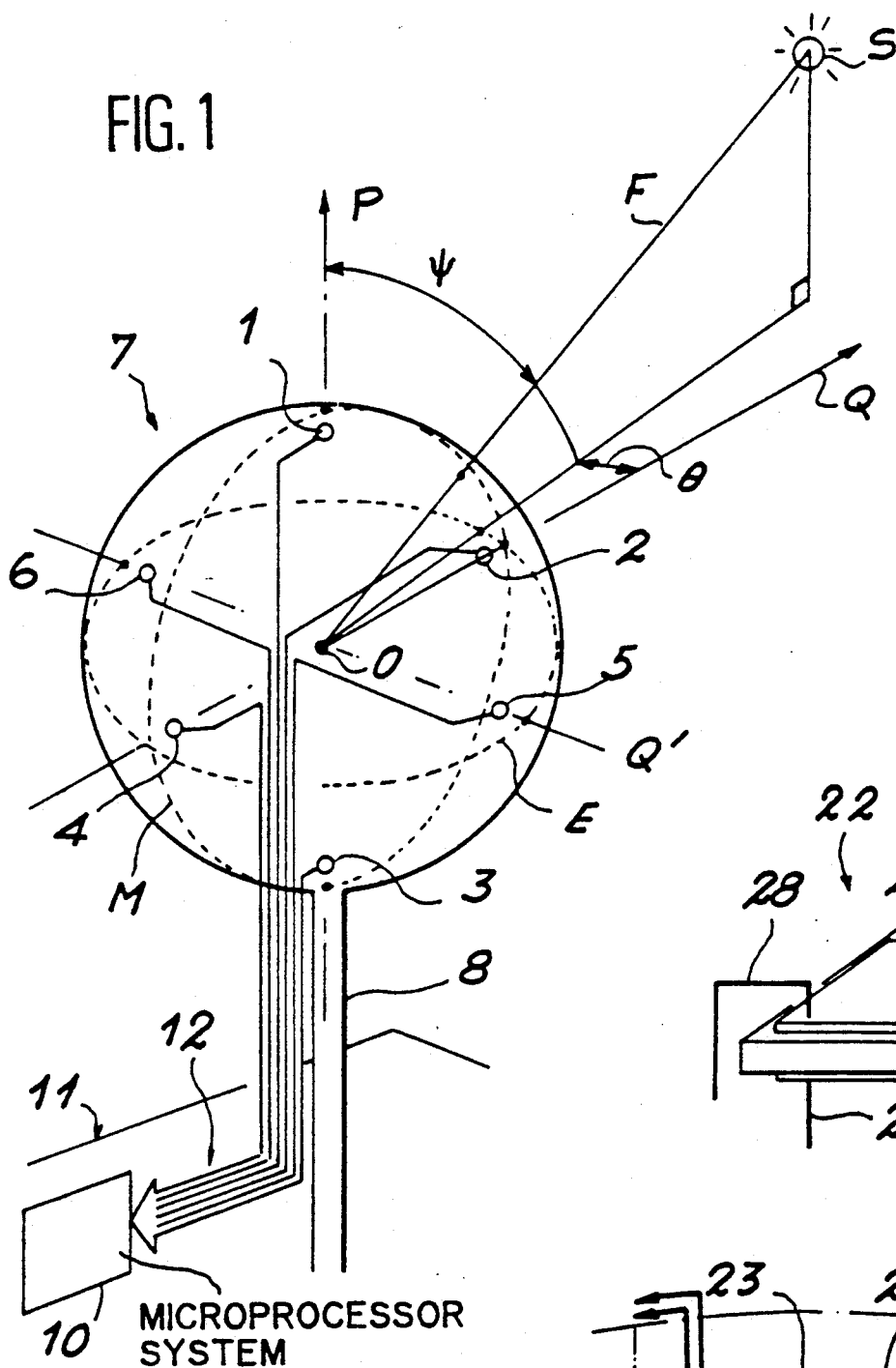
FIG. 1 is a schematic view of a detector made in accordance with this invention.

The detector shown in FIG. 1 comprises six sensors 1–6 inserted in an aluminium sphere 7 and located at the same distance from its center O, not far from the sphere periphery. The sensors 1,2,3 and 4 are located on a meridian plane M of the sphere and the sensors 2,4,5 and 6 on an equatorial plane E perpendicular to the meridian plane.

The sensors 1 and 3 are aligned with the center O along a polar line P, the sensors 2 and 4 along a line Q and the sensors 5 and 6 along another line Q', all said lines being perpendicular to one another. The sphere 7 is brazed to a mast 8 along the extension of the polar line P and which is fixed to a support, which is in the form of an only partly shown robotized vehicle 11. Other designs are obviously possible and consequently the detector can be mounted in fixed manner in a room or a portable support. Its weight is not necessarily very great and the sphere 7 can have a diameter of 10 cm, the sensors 1 to 6 being at an average depth of 1 cm and having a size of approximately 1 cm in all directions. The installation of the detector on a robotized vehicle makes it possible to carry out research without risk of harm from radioactive sources, whereas a fixed detector can be useful for e.g. discovering the location of damage in pipes carrying radioactive liquid within a room and can thus serve as an alarm device.

In FIG. 1, a radioactive source S emits a beam F towards the detector. What is shown here is that part of the beam which arrives at the center 0 of the sphere 7 and is also assumed that those parts of the beam arriving at the other points of the sphere are parallel to one another. This condition is considered to be satisfied if the source has small dimensions and is located at a distance 5 to 10 times greater than the diameter of the sphere 7.

It is possible to define the orientation of the source S by an azimuth angle $\theta$ and a site angle $\psi$. The azimuth $\theta$ corresponds to the angle formed by the beam F with the meridian plane M. The site angle $\psi$ for purposes of this invention comprises the angle between the polar line P and the beam F.

Therefore each of the sensors 1 to 6 is reached by a radiation which has been attenuated by absorption in the sphere 7 in accordance with an exponential law summarized by the formula 1:

$$\dot{D}_i = \frac{\dot{D}_O}{(L+R)^2} e^{-\mu d_i}$$

in which $D_O$ represents the dose rate at one meter from the source and in the air, $D_i$ the dose rate received by the sensor i, L the distance from the source S to the periphery of the sphere 7, R the radius of the sphere 7, $\mu$ the absorption coefficient of the material of sphere 7, and $d_i$ the length of the path covered by the radioactive beam in the sphere 7 before reaching the sensor i.

The formula (2):

$$\dot{D}_i = \frac{n_i}{K}$$

expresses the fact that the dose rate $\dot{D}i$ of the sensors is proportional to the counting rate ni received to within a constant coefficient K.

It is possible to verify that the distances di covered by the radiation as a function of the radius R of the sphere 7, the distance s between each of the sensors 1 to 6 and the periphery of the sphere 7, the azimuth $\theta$ and the site $\psi$ are respectively expressed by the following formulas for sensors 2,4,5 and 6 on the equatorial plane E:

$$s_2 = R\sqrt{1 - \left(1 - \frac{s}{R}\right)^2 (1 - \cos^2\theta \sin^2\psi)} - (R-s)\cos\theta\sin\psi \quad (3)$$

$$s_4 = R\sqrt{1 - \left(1 - \frac{s}{R}\right)^2 (1 - \cos^2\theta \sin^2\psi)} + (R-s)\cos\theta\sin\psi \quad (4)$$

$$s_5 = R\sqrt{1 - \left(1 - \frac{s}{R}\right)^2 (1 - \sin^2\theta \sin^2\psi)} + (R-s)\sin\theta\sin\psi \quad (5)$$

$$s_6 = R\sqrt{1 - \left(1 - \frac{s}{R}\right)^2 (1 - \sin^2\theta \sin^2\psi)} - (R-s)\sin\theta\sin\psi \quad (6)$$

and those of the sensors 1 and 3 on the polar line P by:

$$s_1 = R\sqrt{1 - \left(1 - \frac{s}{R}\right)^2 \sin^2\psi} - (R-s)\cos\psi \quad (7)$$

$$s_3 = R\sqrt{1 - \left(1 - \frac{s}{R}\right)^2 \sin^2\psi} + (R-s)\cos\psi \quad (8)$$

with the angles as defined in FIG. 1.

Three subtractions of these distances making the sensors intervene on the same diameter:

$$s_1 - s_3 = -2(R-s)\cos\psi \quad (9)$$

$$s_2 - s_4 = 2(R-s)\cos\theta\sin\psi \quad (10)$$

$$s_6 - s_5 = -2(R-s)\sin\theta\sin\psi \quad (11)$$

or, after having applied the formulas 1 and 2

$$\mu = \frac{1}{2(R-s)\cos\psi} \ln\frac{n_1}{n_3} \quad (12)$$

$$\mu = \frac{1}{2(R-s)\cos\theta\sin\psi} \ln\frac{n_2}{n_4} \quad (13)$$

$$\mu = \frac{1}{2(R-s)\sin\theta\sin\psi} \ln\frac{n_6}{n_5} \quad (14)$$

make it possible to obtain the expressions of the azimuth $\theta$ and site $\psi$:

$$\theta = \text{Arctg} \frac{\ln\frac{n_6}{n_5}}{\ln\frac{n_2}{n_4}} \quad (15)$$

$$\psi = \text{Arctg} \frac{1}{\cos\theta} \cdot \frac{\ln\frac{n_2}{n_4}}{\ln\frac{n_1}{n_3}} \quad (16)$$

The absorption coefficient $\mu$ can be recalculated by one of the formulas (12) to (14) in order to deduce therefrom the energy of the radiation.

The final formulas are particularly simple as a result of the spherical geometry used and the symmetries of the detector. Therefore the results are more accurate. However, it would be possible to accept sensors located on non-perpendicular diameters or at different depths, but the final formulas will be more complicated, because coefficients to the numerators and denominators of the ratios would no longer be equal and could no longer be eliminated. It is also pointed out that these formulas apply no matter what the angles $\theta$ and $\psi$, and that it is consequently unnecessary to orient the detector, which is of interest when it is installed on a robotized vehicle 11.

In order to carry out these calculations, the detector comprises an electronic microprocessor system 10 connected to each of the sensors 1 to 6 by a pair of electric wires 12. The electric wires have a radial direction in the vicinity of the sensor in question, a part bonded to the surface of the sphere 7 and a part leading to the electronic microprocessor system 10 fixed to the mast 8.

A description will now be given of the sensors making it possible to obtain identical responses, no matter what the orientation of the source S for a given radiation, when said sensors are outside the sphere 7.

Figure 3:
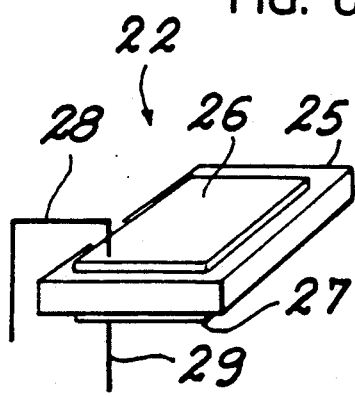
FIG. 3 illustrates in greater detail one of the elements of the radiation sensitive sensors employed in the detector of this invention.
Figure 2:
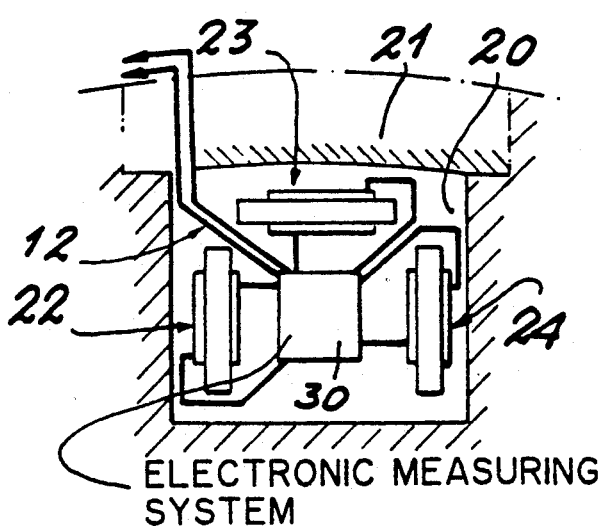
FIG. 2 is a fragmentary sectional view partly in elevation of one of the sensors employed in the detector of this invention.

Reference should be made for this purpose to FIGS. 2 and 3. Each of the sensors 1 to 6 is located in a passage 20 positioned radially in sphere 7 and closed by a cover 21. Each of the sensors 1 to 6 comprises three identical detection pellets 22,23,24 and constituted, as shown in FIG. 3, by a square silicon block 25 covered on two of its faces by two conductive metal deposits 26,27, whereof one is connected by a metal clip 28 to a voltage of 12 V and the other by another metal clip 29 to earth or ground.

Each of the sensors 1 to 6 also comprises an electronic operating system 30 and constituted by components in CMOS technology, which has the advantage of having a very small size. This contributes to reducing the volume of the sensors 1 to 6 and minimizes the absorption phenomena caused by them. The clips 28 and 29 of the pellets 22 to 24. Similarly, effect minimum radiation absorption together with the electric wires 12 for supplying the voltages and for transmitting the counting information to the microprocessor system 10.

Two of the pellets 22 and 4 are parallel and on either side of the electronic measuring system 30, whereas the median pellet 23, which is also adjacent to the measuring system 30, is perpendicular to the pellets 22 and 24 and has two opposite edges close to a respective edge of said two pellets.

The empty space of each sphere opening 20 is filled with a material having a density similar to that of the material of sphere 7, so as to embed the pellets 22 to 24 and the electronic system 30. The filling material must consequently be moldable, whilst also being electrically insulating. If the sphere 7 is made from aluminium, a preferred filler for the sphere apertures comprises a mixture of araldite and alumina powder. The use of a single pellet, such as the median pellet 23 also gives acceptable, but less accurate results.

The sensors 1 to 6 supply pulses, whose frequency is proportional to the dose rate received. In the case of sensors with three pellets 22 to 24, an addition or an averaging of the results takes place.

Aluminium can be recommended as the material of formation for sphere 7 in the case of gamma radiation measurements, as can lead or iron. Hydrogenated components can be used for neutron radiation.

We claim:

1. An orientation detector for source emitting parallel radioactive radiation; said detector comprising a homogeneous sphere formed of a material for absorbing radioactive radiation in proportion to the length of the path traversed by such radiation in said homogeneous material; six radiation sensors arranged in pairs on three different diameters of said sphere and sensitive to radioactive radiation received in accordance with characteristics independent of the direction of the source of such radiation, and means associated with said sensors for measuring and comparing the radioactive radiation received by said sensors and for calculating the azimuth angle and the site angle of a radiation source relative to said detector.

2. The orientation detector according to claim 1 wherein the diameters are perpendicular to one another.

3. The orientation detector according to claim 1 wherein the sensors are al at the same distance from the center of the sphere.

4. The orientation detector according to claim 1 wherein the sensors comprise at least one semiconductor pellet.

5. The orientation detector according to claim 4, wherein the sensors comprise three semiconductor pellets oriented perpendicular to one another.

6. The orientation detector according to claim 4, wherein each of the sensors is disposed in a sphere opening filled with a moldable material having a density identical to that of the material of the sphere.

7. The orientation detector according to claim 6, wherein the sphere is formed of aluminum and the moldable material is a mixture of glue and alumina.

* * * * *